United States Patent [19]
Taguchi et al.

[11] 3,866,106
[45] Feb. 11, 1975

[54] VOLTAGE REGULATOR WITH PROTECTION CIRCUIT FOR AN ALTERNATING CURRENT GENERATOR

[75] Inventors: Yasuo Taguchi; Takehiro Shimonaka, both of Yokohama, Japan

[73] Assignee: Tokyo Shibaura Electric Co., Ltd., Kawasaki-shi, Japan

[22] Filed: June 21, 1973

[21] Appl. No.: 371,956

[30] Foreign Application Priority Data
June 23, 1972 Japan.................................. 47-62937

[52] U.S. Cl.......................... 320/64, 317/13, 322/28
[51] Int. Cl. ....... H02j 7/24, H02h 7/06, H02p 9/30
[58] Field of Search ............ 320/61, 64; 317/13, 33; 322/28

[56] References Cited
UNITED STATES PATENTS

| | | | |
|---|---|---|---|
| 3,539,864 | 11/1970 | Harland, Jr. et al. ............. | 322/28 X |
| 3,581,150 | 5/1971 | Kirk et al. ......................... | 322/28 X |

Primary Examiner—James D. Trammell
Assistant Examiner—Robert J. Hickey
Attorney, Agent, or Firm—Flynn & Frishauf

[57] ABSTRACT

An output voltage regulator with a protection circuit for an alternating current generator comprising a main rectifying circuit for rectifying the output voltage of the alternating current generator to obtain direction current voltage for charging a battery, an auxiliary rectifying circuit causing flow of exciting current through the field winding of the generator, a switching transistor connected in series between the field winding and ground, a sensing terminal connected to the charging terminal of the battery, a control circuit which controls the switching transistor such that when the voltage on the sensing terminal exceeds a predetermined value the switching transistor is turned OFF, and when the voltage becomes below the predetermined value, the switching transistor is turned ON, and a protection circuit connected between the base of the switching transistor and ground, which becomes conductive when the voltage on the sensing terminal becomes substantially zero to connect the base of the switching transistor to ground and cause the switching transistor to turn OFF.

4 Claims, 4 Drawing Figures

3,866,106

VOLTAGE REGULATOR WITH PROTECTION CIRCUIT FOR AN ALTERNATING CURRENT GENERATOR

CROSS REFERENCE TO RELATED APPLICATION

U.S. application Ser. No. 371,955, filed June 21, 1973 in the name of the present inventors.

BACKGROUND OF THE INVENTION

This invention relates particularly to an output voltage regulator with a protection circuit for an alternating current generator.

An alternating current generator is, for example, utilized for the purpose of charging the battery on an automobile. Since the generator is coupled to the automobile engine and driven thereby, the generator output voltage varies greatly with variation of the engine rotational speed. Thus, during charging of the battery from the generator output, it is necessary to utilize a voltage regulator to make the generator output voltage supplied to the battery always constant.

On voltage regulators heretofore, the construction is such that the direct current voltage supplied to the battery is detected, and when this voltage exceeds a predetermined value, the field electron current flow of the generator is cut off, and when said voltage is below the predetermined value, field current is caused to flow.

On such voltage regulators, when for some cause the connection between the regulator voltage detection terminal and the battery becomes disconnected, the detection voltage becomes extremely small, and the condition is identical to that as though the supply voltage to the battery becomes below the predetermined value. Under such a circumstance, the regulator acts to cause generator field current flow, and the generator output continues to rise, and as a result, breakdown of the battery due to overcharging, breakdown of equipment connected to the battery, and finally breakdown of the generator itself will occur.

Thus, the object of this invention is to provide an output voltage regulator for an alternating current generator comprising a protection circuit which prevents abnormal rise of generator output voltage when the regulator voltage detecting circuit does not operate in a normal manner.

SUMMARY OF THE INVENTION

According to this invention, there is provided an output voltage regulator for an alternating current generator comprising a main rectifying circuit to rectify the output voltage for obtaining direct current voltage to charge the battery, an auxiliary rectifying ciruit for supplying exciting current to the field winding of the generator, a switching transistor connected in series between said field winding and ground, a sensing circuit connected to the charging terminal of said battery, a control circuit to control conductivity of said switching transistor such that when the sensed voltage at said sensing circuit exceeds a predetermined value switching OFF occurs, and when below the predetermined value switching ON occurs, and a protection circuit connected between the base of the switching transistor and ground, which becomes conductive when the sensed voltage at the sensing circuit becomes substantially zero to connect the base of the switching transistor to ground, and causing the switching transistor to turn OFF.

DETAILED DESCRIPTION OF ILLUSTRATED EMBODIMENTS

Figure 1:
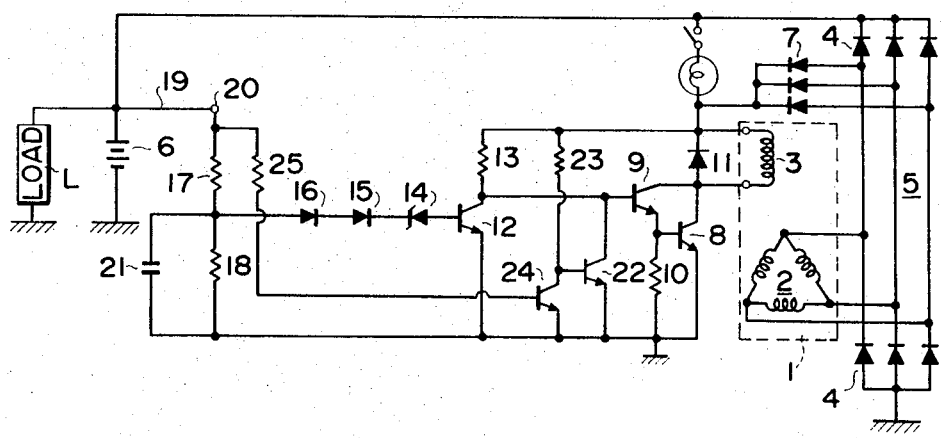
FIG. 1 shows the circuit diagram of an embodiment of this invention.

In FIG. 1, an alternating current generator, for example carried on an automobile, comprises a three-phase alternating current output winding 2 and field winding 3. The three-phase alternating current generated in the three-phase output winding 2 is rectified by a main bridge rectifier 5 comprised of six diodes 4. The negative terminal of the main bridge rectifier 5 is grounded; and positive terminal is connected to the charging or positive terminal of automobile battery 6. The negative terminal of battery 6 is grounded. Battery 6 supplies direct current power to the ignition equipment, lighting equipment, and other electrical equipment on the automobile. These equipments are shown as a load L in FIG. 1. The three-phase alternating corrent generated in output winding 2 is also rectified by an auxiliary rectifier 7 comprised of three diodes, and the direct current output from rectifier 7 is supplied to one end of field winding 3. The other end of field winding 3 is grounded through the collector and emitter of a switching transistor 8. Between the collector and base of switching transistor 8 the collector and emitter of a transistor 9 are connected in Darlington connection, a bias resistor 10 is connected between the base of switching transistor 8 and ground, for protection of transistors 8 and 9, a diode 11 is connected in reverse direction in parallel with field winding 3.

The base of transistor 9 is connected to the collector of a control transistor 12 forming a control circuit, the collector of transistor 12 is connected through a resistor 13 to output terminal of auxiliary rectifier 7, and the emitter is grounded. The base of control transistor 12, successively through a Zener diode 14, diodes 15 and 16, is connected to the juncture of voltage dividing resistors 17 and 18. The other end of resistor 17 is connected to the one end of a lead line 19 via a sensing terminal 20, the other end of line 19 being connected to the positive terminal of battery 6, and the other terminal of resistor 18 is grounded. A capacitor 21 is connected across both terminals of resistor 18 in parallel for absorbing sudden variations in voltage at the juncture of resistors 17 and 18.

Between the base of transistor 9 and ground is connected the collector and emitter of a transistor 22 of a protection circuit, the base of transistor 22 is connected to the juncture of resistor 23, which is connected in series between the output terminal of auxiliary rectifier 7 and ground, and the collector of a transistor 24. The base of transistor 24 is connected through a resistor 25 forming a protection circuit to sensing terminal 20.

In the construction of FIG. 1, when the sensing circuit, comprised of resistors 17 and 18, lead line 19 and sensing terminal 20, operates normally, when the voltage detected at sensing terminal 20 exceeds the predetermined value, Zener diode 14 conducts and control transistor 12 conducts. Resulting from this, the electric potential of the base of transistor 9 becomes an approximately ground potential, and transistor 9 becomes non-conductive, and the base current of switching transistor 8 becomes zero. Resulting from this, since electric current stops flowing through field winding 3, and output voltage of generator 1 drops. Thus, when the voltage detected at sensing terminal 20 drops below the predetermined value, Zener diode 14 becomes in non-conductive condition, and since transistor 12 becomes in OFF condition, switching transistors 8 and 9 become in ON state, and exciting current again flows through field winding 3.

At this point, if the connection between lead line 19 and sensing terminal 20 becomes disconnected, or when lead line 19 becomes severed, the electric potential of the juncture of sensing resistors 17 and 18 becomes approximately zero. As a result, since control transistor 12 becomes OFF, switching transistors 8 and 9 become conductive. On the other hand, at the same time, by way of resistor 25 the zero potential of sensing terminal reaches the base of transistor 24, and since transistor 24 becomes OFF, transistor 22 becomes ON, and the electric potential of the base of transistor 9 becomes zero. Therefore, transistors 8 and 9 do not become ON and are maintained coercively in the OFF state, and needless electric current flowing through field winding 3 and excessive rise of output voltage do not occur. Also, in actually manufacturing the equipment of FIG. 1, for example transistors 12, 22 and 24, diodes 14, 15 and 16, and resistor 25 may be formed integrally into an integrated circuit, and the entire equipment may be of simple and compact construction.

Figure 2:
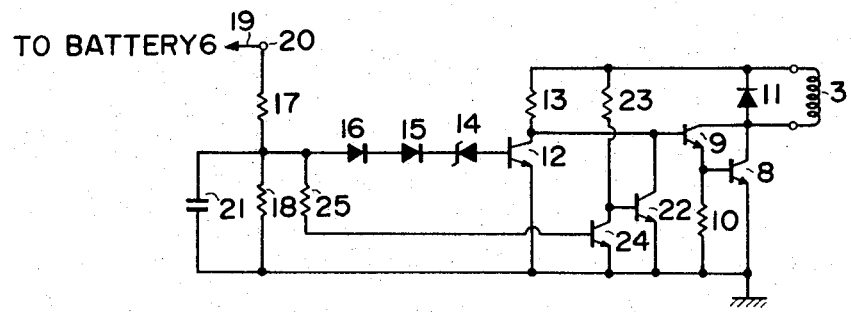
FIG. 2 shows the circuit diagram of another embodiment of this invention.

Other modified examples of the embodiment will be explained below, referring to FIG. 2 to FIG. 4. Here, components the same as in FIG. 1 bear identical reference numbers, and detailed explanations thereof are omitted. In FIG. 2, one end of resistor 25 of the auxiliary protection circuit is connected to the juncture of resistors 17 and 18, instead of sensing terminal 20 of FIG. 1, and aside from this, the construction is entirely identical to that of FIG. 1. In this instance, for example, since due to severing of lead line 19 abnormal electric potential drop at sensing terminal 20 immediately results in electric potential drop at the juncture of resistors 17 and 18, protective action is carried out in a manner similar to the embodiment depicited in FIG. 1.

Figure 3:
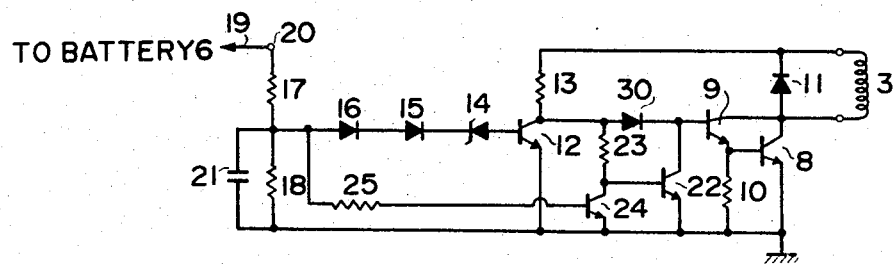
FIG. 3 shows the circuit diagram of still another embodiment of this invention.

In FIG. 3, the cathode and anode of a diode 30 are connected between the base of transistor 9 and the collector of transistor 12, one end of resistor 23 is connected to the juncture of the anode of diode 30 and the collector of transistor 12. The remainder of the components are arranged in the same manner as in the embodiment of FIG. 2. In this modified example, protective action is the same as that in FIG. 2, but if one end of resistor 23 is connected in this manner to the collector of transistor 12, compared to the instance of FIG. 2, the resistance value of resistor 23 may be established at a small value, and is more easily formed in an integrated circuit.

Figure 4:
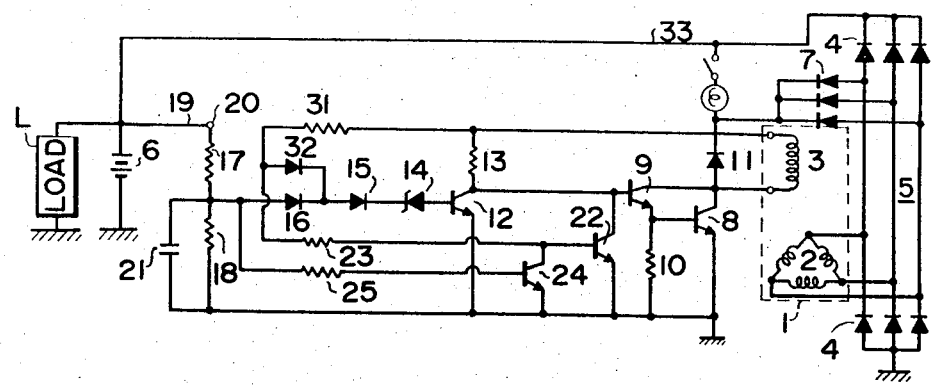
FIG. 4 shows the circuit diagram of a further embodiment of this invention.

In FIG. 4, one end of resistor 23 is connected through resistor 31 to the juncture of field winding 3 and resistor 13. The juncture of resistors 23 and 31 is, through a diode 32, connected to the connection point of diodes 15 and 16. The remainder is constructed identically to FIG. 2. This embodiment comprises, in addition to the protective faculty of the embodiments of FIGS. 1 to 4, a further separate faculty. That is, in FIG. 4, if lead line 33 connecting the output terminal of main rectifier 5 and the positive terminal of battery 6 is severed or disconnected and battery 6 is not being charged, breakdown of generator 1 will be prevented. For example, although due to severing of lead line 33 battery 6 cannot be charged, the electric potential of sensing terminal 20 gradually drops, and when Zener diode 14 becomes OFF, control transistor 12 becomes OFF, and transistors 8 and 9 become in ON condition. Due to this, exciting current flows through field winding 3 and output voltage of generator 1 rises. Due to this voltage rise, since the output voltage of auxiliary rectifier 7 rises, the anode voltage of diode 15, by way of resistor 31 and diode 32 rises. Zener diode 14 becomes ON at the predetermined voltage. Due to this, control transistor 12 becomes ON, transistors 8 and 9 at this time become OFF, and increase of output voltage of generator 1 ceases. Thus, breakdown of generator 1 due to excessive output voltage rise is prevented in advance.

In the above-mentioned embodiments, switching transistors 8 and 9 are connected in Darlington connection, but similar operation may be obtained by replacing them only with a single switching transistor.

What is claimed is:

1. An output voltage regulator for an alternating current generator comprising:
    a main rectifying circuit for obtaining direct current voltage for battery charging by rectifying alternating current generated in said generator;
    an auxiliary rectifying circuit having an output terminal for supplying exciting current to the field winding of said generator;
    a switching circuit having at least one switching transistor connected in series between said field winding and ground;
    a sensing circuit having two serially connected voltage dividing resistors coupled between the charging terminal of the battery and ground;
    a control circuit including a control transistor having a base electrode coupled to the juncture of said voltage dividing resistors, a collector electrode coupled to the output terminal of said auxiliary rectifying circuit via a first biasing resistor and to the base electrode of said switching transistor and an emitter electrode coupled to ground, said control circuit being operative to control the conductivity of said switching transistor such that OFF and ON conditions of said switching transistor are attained respectively when the sensed voltage on said sensing circuit exceeds and remains below a predetermined value; and
    a protection circuit including a first protection transistor coupled between ground and the output terminal of said auxiliary rectifying circuit via a second biasing resistor and having its base electrode coupled to the charging terminal of said battery through a third biasing resistor, and a second protection transistor having its collector and emitter electrodes coupled between ground and the base electrode of said switching transistor and its base electrode coupled to the collector electrode of said first protection transistor.

2. An output voltage regulator according to claim 1 wherein the base electrode of said first protection transistor is coupled to the juncture of said voltage dividing resistors via said third biasing resistor.

3. An output voltage regulator according to claim 2 wherein the collector electrode of said first protection transistor is coupled to the base electrode of said switching transistor via a diode.

4. An output voltage regulator according to claim 1 wherein:
the output terminal of said auxiliary rectifying circuit is coupled to ground via serially connected first and second resistors and to the base of said control transistor through a series circuit which comprises said first resistor and a diode;
the base electrode of said second protection transistor is coupled to the juncture of said first resistor and diode via a third resistor; and
the collector and emitter electrodes of said first protection transistor are coupled between the base electrode of said second protection transistor and ground, the base electrode being coupled to the juncture of said voltage dividing resistors via said third voltage dividing resistor via said third biasing resistor.

* * * * *